(12) United States Patent
South et al.

(10) Patent No.: US 8,083,074 B2
(45) Date of Patent: Dec. 27, 2011

(54) FILTER CARTRIDGE RETENTION TO NUTPLATE

(75) Inventors: Kevin C. South, Cookeville, TN (US); Ismail C. Bagci, Cookeville, TN (US); James L. Eickhoff, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 508 days.

(21) Appl. No.: 12/277,756

(22) Filed: Nov. 25, 2008

(65) Prior Publication Data

US 2010/0126928 A1    May 27, 2010

(51) Int. Cl.
*B01D 27/08*    (2006.01)
*B01D 35/30*    (2006.01)

(52) U.S. Cl. ........ 210/440; 210/444; 210/450; 210/454; 210/455

(58) Field of Classification Search .................. 210/232, 210/440, 443, 444, 450, 453, 454, 455
See application file for complete search history.

(56) References Cited

U.S. PATENT DOCUMENTS

| | | | |
|---|---|---|---|
| 5,013,434 A | | 5/1991 | Furrow |
| 5,269,913 A | * | 12/1993 | Atkins ........................ 210/444 |
| 5,312,546 A | | 5/1994 | Janik |
| 5,922,199 A | | 7/1999 | Hodgkins |
| 6,146,527 A | * | 11/2000 | Oelschlaegel ................ 210/450 |
| 6,959,819 B2 | * | 11/2005 | Moscaritolo et al. ......... 210/440 |
| 6,994,787 B1 | * | 2/2006 | Stamey et al. ................ 210/232 |
| 7,708,147 B2 | * | 5/2010 | Attassery et al. ............. 210/455 |
| 2005/0178706 A1 | * | 8/2005 | Bagci et al. .................. 210/443 |
| 2006/0186036 A1 | * | 8/2006 | South et al. .................. 210/443 |
| 2007/0095744 A1 | | 5/2007 | Bagci et al. |
| 2009/0008320 A1 | * | 1/2009 | Harder et al. ................ 210/440 |
| 2009/0014381 A1 | | 1/2009 | South et al. |

FOREIGN PATENT DOCUMENTS

EP    0718021    6/1996

OTHER PUBLICATIONS

U.S. Appl. No. 12/354,612, filed Jan. 15, 2009.
International Search Report for application No. PCT/US2009/058202, dated May 18, 2010 (3 pages).
Written Opinion of the International Searching Authority for application No. PCT/US2009/058202, dated May 18, 2010 (4 pages).

* cited by examiner

*Primary Examiner* — Christopher Upton
(74) *Attorney, Agent, or Firm* — Hamre, Schumann, Mueller & Larson, P.C.

(57) ABSTRACT

A filter assembly where the filter cartridge is secured to the nutplate and a seal is provided between the filter cartridge and the nutplate. The sealing relationship between the filter cartridge and the nutplate is maintained during use of the filter assembly without using a spring engaged with the filter cartridge that biases the filter cartridge into engagement with the nutplate.

20 Claims, 9 Drawing Sheets

FILTER CARTRIDGE RETENTION TO NUTPLATE

FIELD

This disclosure relates generally to fluid filtration, and particularly, but not by way of limitation, to the design of filter cartridge retention systems for the support and retention of a filter cartridge relative to a nutplate and a filter housing.

BACKGROUND

A known type of filter assembly used in automotive/diesel truck engines for filtering fuel includes a filter housing, a filter cartridge disposed in an interior space of the filter housing and a nutplate for closing an open end of the filter housing. Fuel to be filtered flows from the fuel tank into an unfiltered fuel region of the filter assembly, flows through the filter cartridge to a filtered fuel region and then flows to the engine. In these types of filters, the filter cartridge is typically held in place by a spring that engages the bottom of the filter cartridge and forces the filter cartridge upward into engagement with the nutplate through an elastomeric seal that prevents bypass of unfiltered fuel around the filter cartridge from the unfiltered fuel region to the filtered fuel region. If the connection between the filter cartridge and the nutplate is compromised, unfiltered fuel can mix with the filtered fuel.

An effective retention mechanism is important for retaining the collection between the filter cartridge and the nutplate in the filter assembly.

SUMMARY

A filter assembly is described that provides improved methods of securing a filter cartridge to a nutplate while maintain a sealing relationship between the filter cartridge and the nutplate during use of the filter assembly, without using a spring that biases the filter cartridge into engagement with the nutplate. The sealing relationship can be achieved without an elastomeric seal between the filter cartridge and the nutplate or an elastomeric seal can be provided between the two. The filter assembly concepts described herein can be used in automotive/diesel truck engines for filtering various engine fluids including but not limited to fuels such as diesel fuel, oils, and hydraulic fluids.

The upper end of the filter cartridge can be connected to the nutplate using a number of different methods, each of which provides a seal between the filter cartridge and the nutplate. No spring is provided within the housing that is engaged with the first end of the filter cartridge for biasing the cartridge into engagement with the nutplate. Means, for example ribs or other protrusions on the filter housing that prevent or limit movement of the filter cartridge away from the nutplate, help retain the connection between the filter cartridge and the nutplate, thereby maintaining the seal between the filter cartridge and the nutplate without using a spring. The seal can be provided solely by the connection between the filter cartridge and the nutplate, for example an interference fit, eliminating the need for an elastomeric seal between the filter cartridge and the nutplate. Alternatively, an elastomeric or other seal structure can be provided between the filter cartridge and the nutplate.

In one embodiment, a filter assembly includes a housing having a side wall, a base portion, an open end, an interior space, and a plurality of ribs formed on an inner surface of the housing within the interior space. A nutplate is configured to engage the side wall for closing the open end of the housing. The nutplate includes a first fluid passage through which filtered fluid from the interior space exits the filter assembly, and a second fluid passage through which fluid to be filtered enters the interior space. A filter cartridge is disposed within the interior space, where the filter cartridge includes a first end facing the base portion of the housing and a second end facing the open end and the nutplate. The second end is connected to the nutplate and there is a seal between the second end and the nutplate that prevents leakage of fluid between the second end and the nutplate. At least some of the ribs include steps positioned adjacent to the first end of the filter cartridge that are sized for engagement with the first end to limit movement of the filter cartridge away from the nutplate.

In an embodiment, there is no spring within the housing that is engaged with the first end of the filter cartridge. Therefore, sealing between the filter cartridge and the nutplate is maintained without using a spring. In another embodiment, there is no elastomeric seal between the filter cartridge and the nutplate. However, in certain embodiments an elastomeric seal can be provided.

In another embodiment, the filter assembly includes a can having a side wall, a bottom wall connected to the side wall and defining a base portion of the can, an open end opposite the base portion, an interior space, and a plurality of ribs formed on an inner surface of the can within the interior space. A nutplate is configured to engage the side wall for closing the open end of the can. The nutplate includes a fluid outlet through which filtered fluid from the interior space exits the filter assembly, and a fluid inlet through which fluid to be filtered enters the interior space. A filter cartridge disposed within the interior space, where the filter cartridge includes a ring of filter material that defines within the interior space of the can an unfiltered fluid side in communication with the fluid inlet and a filtered fluid side in communication with the fluid outlet. The ring of filter material includes a first end adjacent the base portion of the housing and a second end adjacent the open end and the nutplate. The second end is connected to the nutplate and there is a seal between the filter cartridge and the nutplate that prevents leakage of fluid between the filter cartridge and the nutplate from the unfiltered fluid side to the filtered fluid side. In addition, at least some of the ribs include steps positioned adjacent to the first end of the ring of filter material that are sized for engagement with the filter cartridge to limit movement of the filter cartridge away from the nutplate.

This summary is an overview of some of the teachings of the present application and is not intended to be an exclusive or exhaustive description of the present subject matter. Further details about the present subject matter are found in the detailed description and appended claims. Other aspects of the present subject matter will be apparent to persons skilled in the art upon reading and understanding the following detailed description and viewing the drawings that form a part thereof, each of which are not to be taken in a limiting sense.

DRAWINGS

DETAILED DESCRIPTION

Figure 1A:
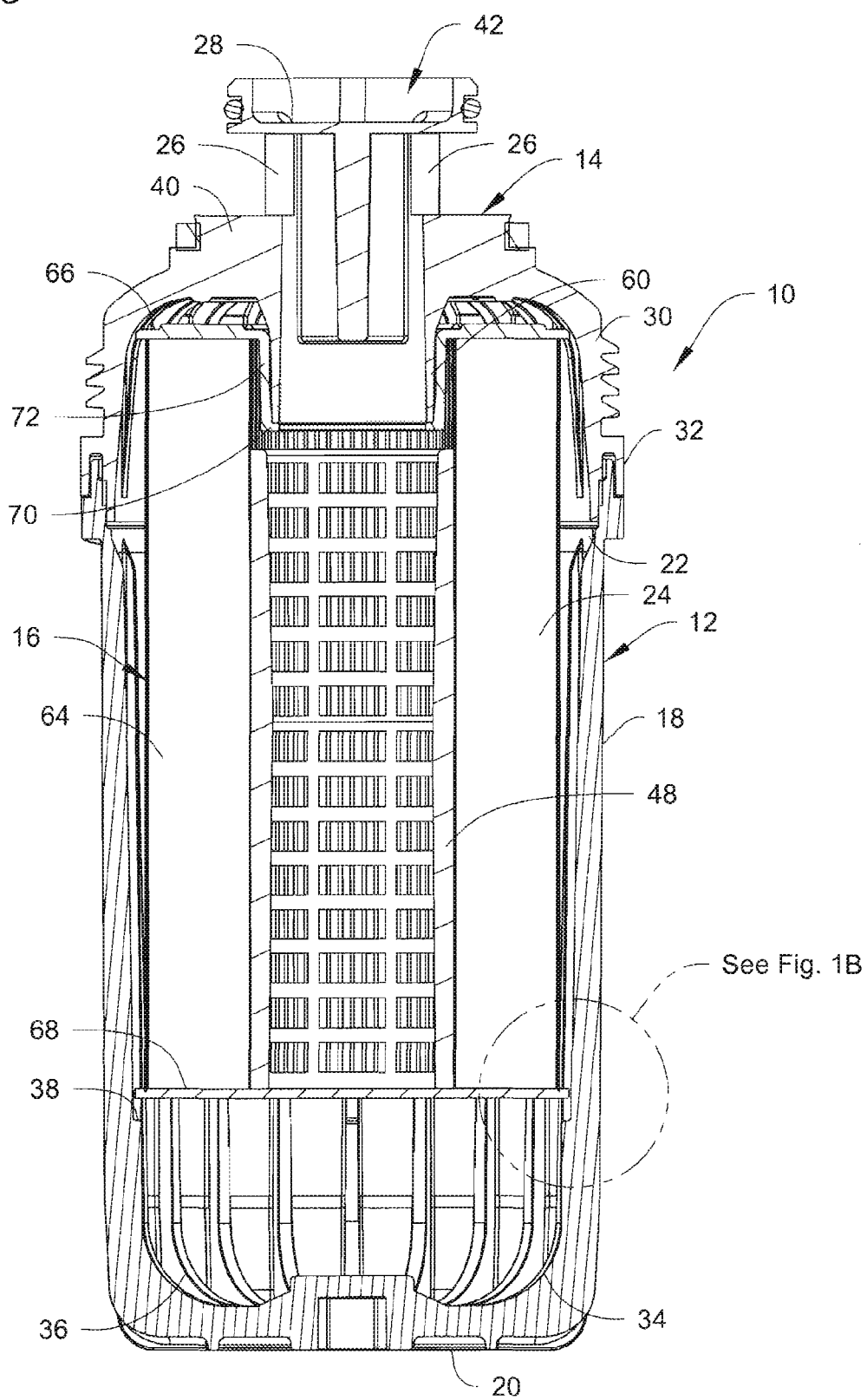
FIG. 1A is a cross sectional side view of a filter assembly that includes protruding steps.

The terms "above," "on," "under," "top," "bottom," "up," "down," "upper," "lower," "horizontal," and "vertical" and the like used herein are in reference to the relative orientations of the filter assembly and its constituent parts in use depicted in the figures. The use of these terms is not intended to limit the claims unless explicitly contained in the claims.

A filter assembly is described and illustrated herein where structure is provided to hold a filter cartridge in engagement with a nutplate to maintain a sealing relationship between the filter cartridge and the nutplate during use of the filter assembly without using a spring that biases the filter cartridge into engagement with the nutplate. The embodiments illustrated and described herein do not include an elastomeric seal sealing between the filter cartridge and the nutplate. However, in other embodiments, an elastomeric seal may be provided between the filter cartridge and the nutplate.

The filter assembly concepts described herein can be used in automotive/diesel truck engines for filtering various engine fluids including but not limited to fuels such as diesel fuel, oils, coolants, and hydraulic fluids. The concepts will be described herein with respect to a fuel filter assembly. However, it is to be realized that the concepts can be applied to other types of filter assemblies as well.

With reference to FIGS. 1A-C and 2, a fuel filter assembly 10 is illustrated. The filter assembly 10 includes a unitary, molded housing 12 formed from non-metallic material, for example a plastic or a composite. The housing 12 has a substantially cylindrical sidewall 18, a base portion 20 that forms a closed end of the housing, an open end 22, and an interior space 24 defined by the side wall 18 and the base portion 20. In the illustrated embodiment, the housing 12 is generally cylindrical in shape, although in appropriate circumstances the housing 12 could have different shapes.

The filter assembly 10 also includes a filter cartridge 16 disposed at least partially in the interior space 24. The filter cartridge 16 includes a ring of filter media 64, a top endplate 66 and a bottom endplate 68. The filter media 64 is configured to remove undesirable contaminants from fuel and, in the illustrated embodiment, to separate water from the fuel. However, the filter cartridge can be designed for particle filtration without a water separation function if desired. The filter media 64 is disposed around a central, perforated tube 48 that is positioned between the endplates 66, 68 to hold the shape of the filter media 64. The endplates 66, 68 are preferably formed from non-metallic material, for example a plastic or a composite. A layer of adhesive such as a polyurethane potting compound or plastisol is used to securely bond each endplate 66, 68 to the filter media 64. In other embodiments, the filter media can be embedded within the material forming the endplates.

In the illustrated embodiment, the filter cartridge 16 is designed for outside-in flow, where fuel to be filtered flows radially inward through the filter media 64 from an unfiltered fuel region defined between the outside of the filter media 64 and the inner surface of the sidewall 18. After passing through the filter media 64, the filtered fuel flows through the perforated tube 48 into a filtered fuel region and then out the filter assembly. However, in other embodiments, the filter cartridge could be designed for inside-out fluid flow of the fluid to be filtered.

As shown in FIG. 1A, when the filter cartridge includes a water separation function, the filter housing 12 includes a collection sump area 34 that is designed to collect water separated by the filter cartridge 16. The collection sump area 34 is located in the lower portion of the housing 12 below the bottom endplate 68 of the filter cartridge 16. In one embodiment, the axial depth of the collection sump 34 measured from the bottom of the endplate 68 to the inner surface of the base portion 20 is about 2-3 inches.

Figure 2:
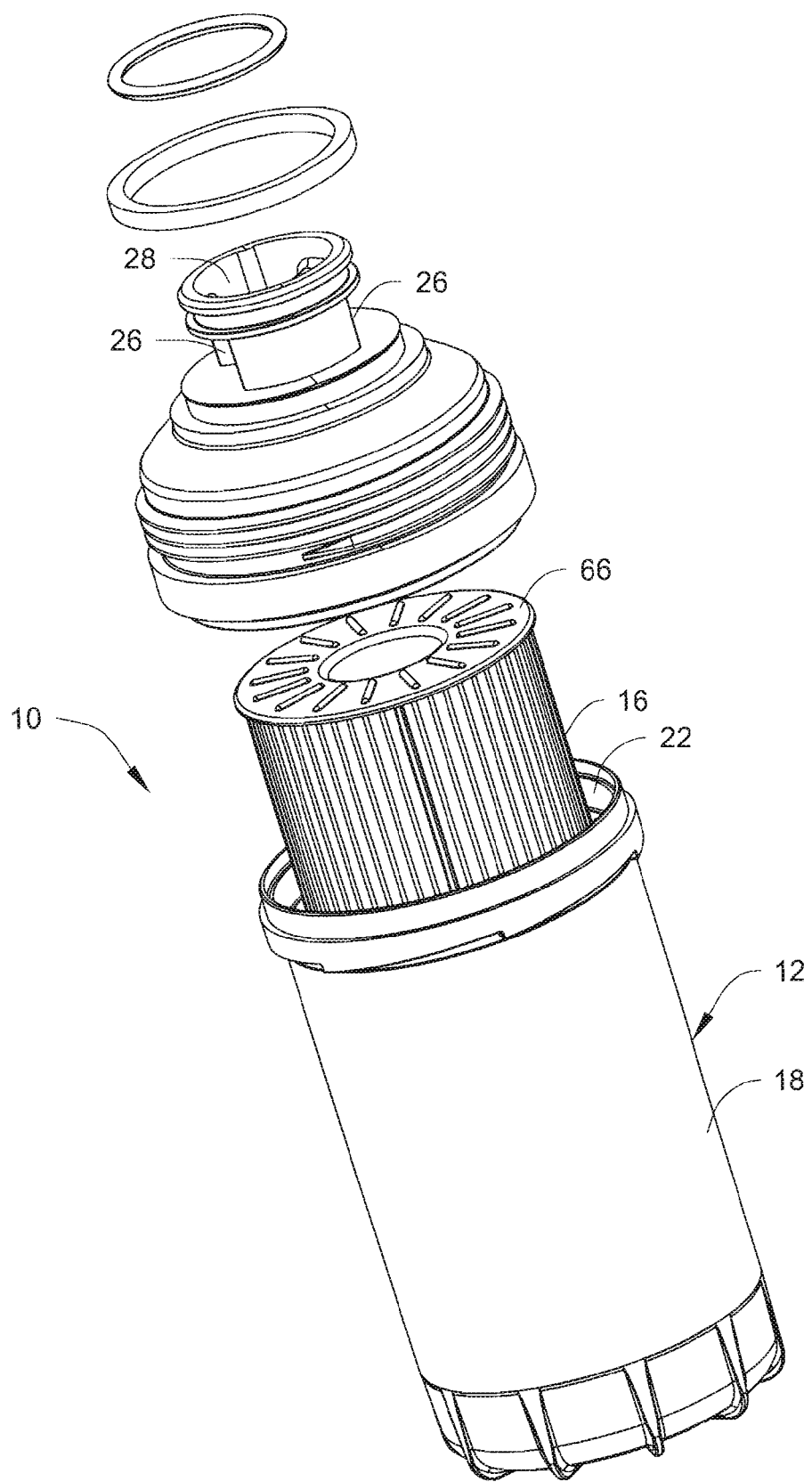
FIG. 2 is an exploded isometric view of the filter assembly.

The filter assembly 10 further includes a nutplate 14 adapted to engage the housing 12 to close the open end 22. As used herein, a nutplate 14 is any structure that is designed to close the open end of the filter housing, allows fuel to be filtered to enter the filter assembly 10, allows filtered fuel to exit the filter assembly, and that has any of the other functions of the nutplate 14 illustrated and described herein. The nutplate is not limited to a plate-like structure, and can be configured as illustrated in FIGS. 1A and 2, the nutplate can have the configurations shown in FIGS. 3-8, or it can have other configurations not specifically illustrated.

As shown in FIG. 1A, the nutplate 14 includes a cylindrical skirt portion 30 having a bottom edge 32 thereof configured to be attached to a top edge of the sidewall 18 to close the open end 22. The nutplate 18 also includes a top wall 40 and a central protrusion 42 projecting upwardly from the top wall 40. The central protrusion 42 defines a plurality of, for example two, fuel inlet openings 26 disposed on opposite sides of the protrusion 42 through which fuel to be filtered enters the filter assembly. Inlet channels lead from the openings 26 down through the protrusion and into the region above the top endplate 66. From there, the fuel flows between ribs defined on the inner surface of the top wall 40 past the edge of the top endplate 66 to the unfiltered fuel region defined between the outside of the filter media 64 and the inner surface of the sidewall 18. The protrusion 42 also defines a plurality of, for example two, fuel outlet openings 28 disposed on opposite sides of the protrusion 42 through which filtered fuel exits the filter assembly. Outlet channels extend from the filtered fuel region upwardly through the protrusion 42 to the outlet openings 28. A similar arrangement of inlet and outlet passages is disclosed in U.S. patent application Ser. No. 11/777,861, filed on Jul. 13, 2007.

The top endplate 66 of the filter cartridge 16 is engaged with the nutplate 14 via an interference fit that provides a sealing relationship between the filter cartridge and the nutplate without an elastomeric seal between the filter cartridge and the nutplate. In particular, with reference to FIG. 1A, the nutplate 14 includes a downwardly extending, generally circular sleeve 60 that is unitarily molded as part of the nutplate 14 and extends downwardly from the top wall 40. The top endplate 66 is generally ring-shaped, and has a generally circular sleeve 72 extending downwardly inwardly of the filter media toward the tube 48. The inner diameter of the sleeve 72 is only slightly greater than the outer diameter of the sleeve 60 of the nutplate 14, so that when the sleeve 60 is inserted into the sleeve 72, a tight interference fit is created. This helps secure the filter cartridge 16 to the nutplate 14 as well as form a fluid tight interface between the contact surfaces. A short flange 70 extends inwardly from the end of the sleeve 72 toward the axis of the filter cartridge 16 for stopping the insertion of the sleeve 60 into the sleeve 72.

The interference fit between the sleeves 60, 72 seals the filter cartridge to the nutplate, preventing leakage of unfiltered fuel to the filtered fuel region. Further, the interference connection eliminates the need for an elastomeric seal between the filter cartridge and the nutplate.

Figure 1B:
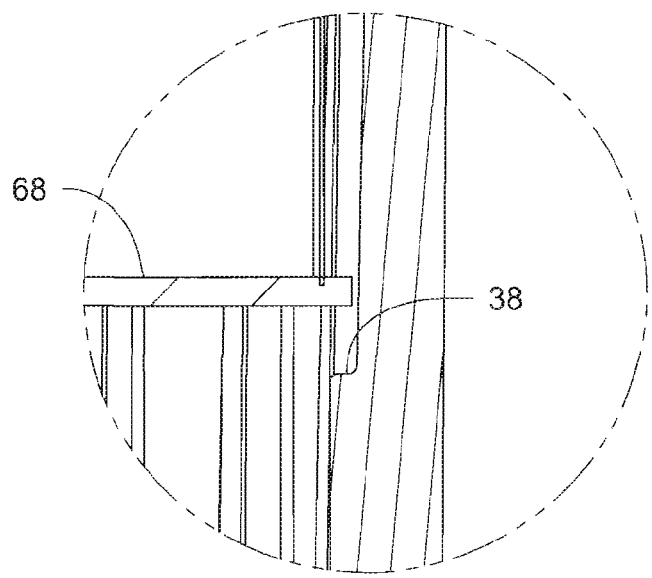
FIG. 1B is an enlarged view of the circled area in FIG. 1A.
Figure 1C:
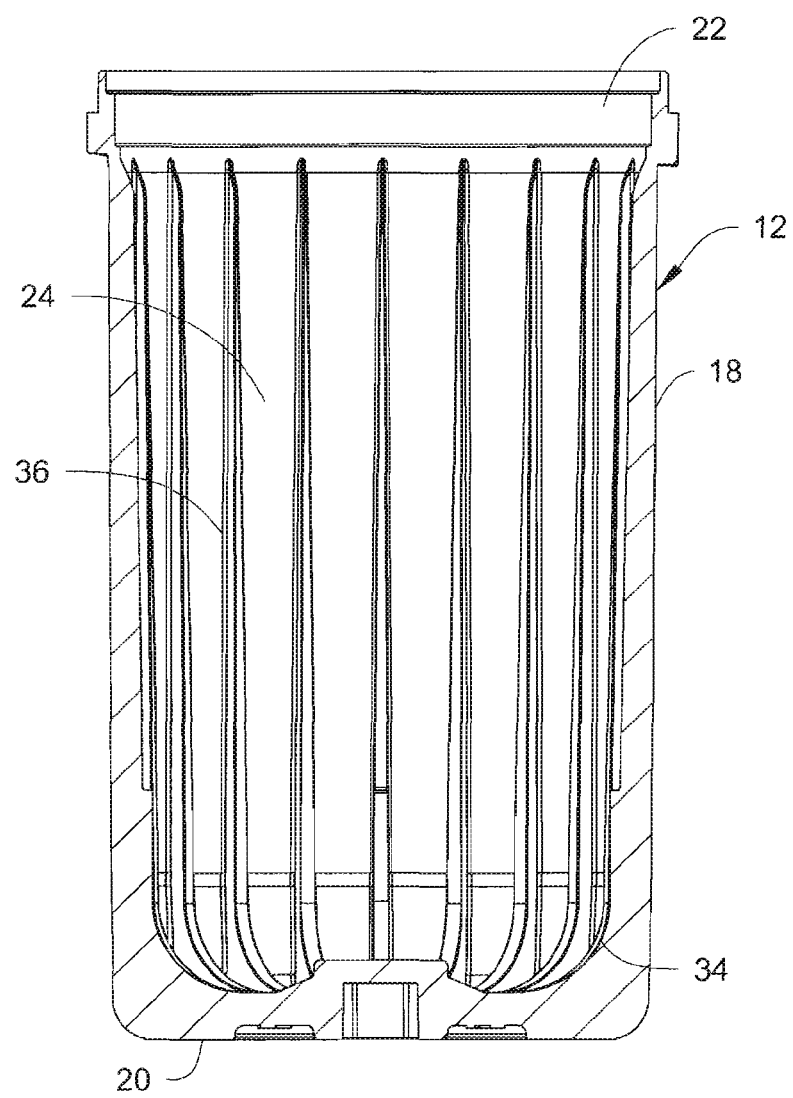
FIG. 1C is cross sectional side view of the filter housing with the nutplate and the filter cartridge removed.

With reference to FIGS. 1A-C, the inner surface of side wall 18 of the housing 12 is formed with a plurality of ribs 36. The ribs 36 are uniformly spaced-apart from each other, and extend from near the open end 22 of the housing 12 down to the base portion 20 to provide structural support and rigidity to the housing 12 as well as underlie and provide support to the filter cartridge 16. As best seen in FIG. 1B, at least some of the ribs 36 include a step 38 that protrudes radially inwardly a sufficient distance so that they can engage with the bottom endplate 68 to limit movement of the filter cartridge away from the nutplate. The steps 38 can be integrally molded with the ribs 36 and the rest of the housing 12, or the steps 38 can be separate components that are attached to the ribs 36.

The steps 38 are positioned a short distance beneath the bottom endplate 68 to limit downward movement of the filter cartridge. If the interference fit between the nutplate 14 and the top endplate 66 is compromised, for example due to vibration and/or temperature effects, and the filter cartridge 16 transitions axially along the interference fit, the bottom endplate 68 will engage the steps 38 and limit downward movement of the filter cartridge so that the sleeve 60 remains within the sleeve 72 to maintain the seal between the sleeves 60, 70. In one non-limiting, exemplar, embodiment, the steps 38 are located a distance beneath the bottom endplate 68, for example a distance of about 1.0 mm to about 4.0 mm. Not all of the ribs 36 need to include a step 38. In the illustrated embodiment, four steps 38 are provided on diametrically opposed ribs 36. However, a larger or smaller number of steps 38 can be used as long as the steps limit the filter cartridge from falling toward the sump area 34.

Therefore, the steps 38 form means that aid in retaining the upper end of the filter cartridge 16 in a position engaged with the nutplate 14 to maintain the sealing relationship between the filter cartridge and the nutplate, without requiring the traditional spring engaged with the bottom endplate for biasing the filter cartridge upward into engagement with the nutplate. The steps 38 limit movement of the filter cartridge away from the nutplate to maintain the interference fit between the sleeve 60 and the sleeve 72 so that there is always a seal between the two.

Figure 3:
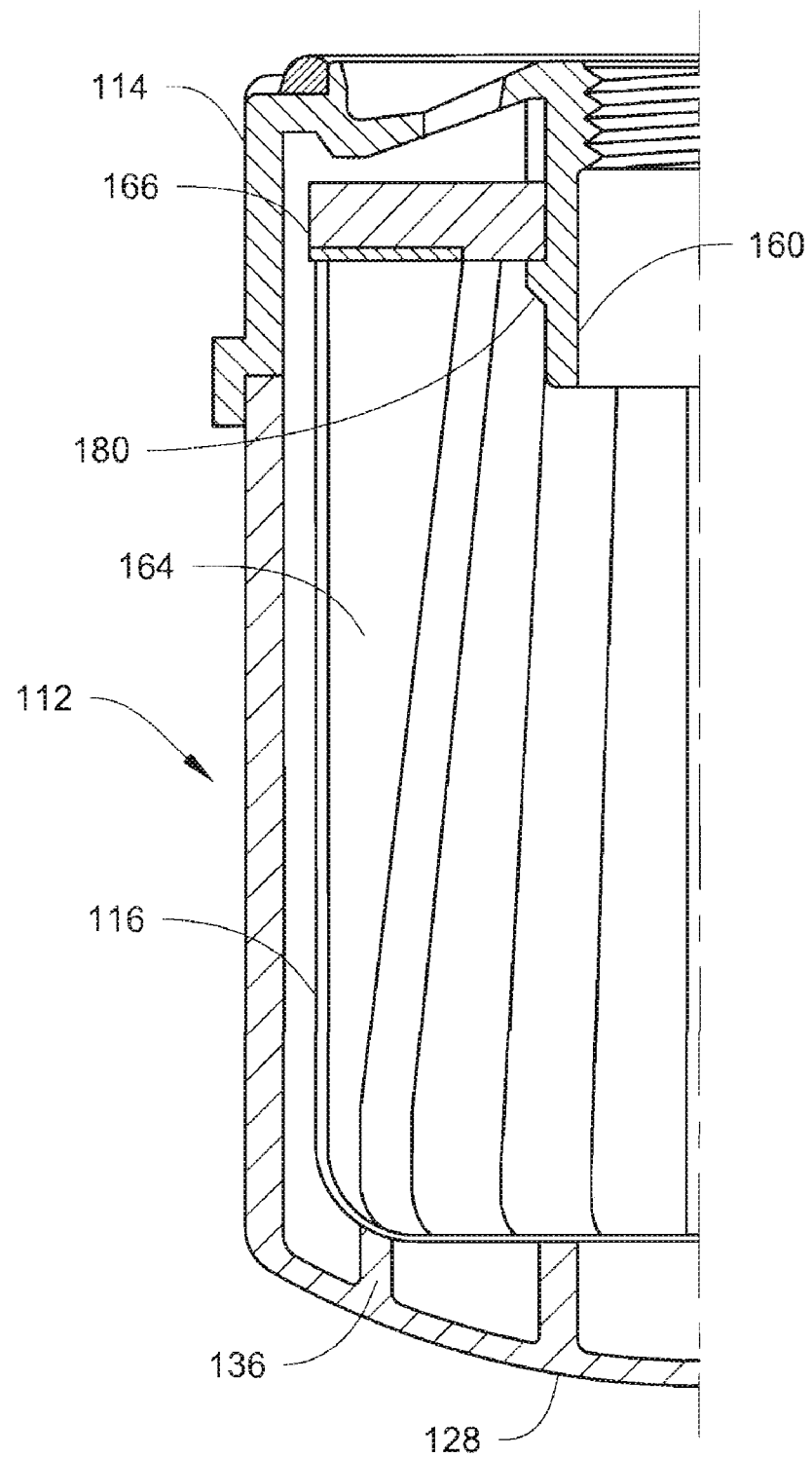
FIG. 3 is a partial cross sectional view of a filter cartridge and nutplate connected via a snap-fit connection.

FIG. 3 illustrates an embodiment that includes a nutplate 114 secured to the open end of a housing 112. The nutplate 114 includes a central sleeve 160 that extends toward the interior of the housing. The sleeve 160 includes a circumferential, radial bump 180. The filter cartridge 116 includes a top endplate 166 with a central aperture sized to closely receive the sleeve 160. The endplate 166 is designed to snap onto the sleeve 160 to form a snap-fit connection to secure the cartridge 116 to the nutplate 114, with the tight fit between the endplate 166 and the sleeve 160 providing a seal. When the sleeve 160 is initially inserted into the aperture of the endplate 166, the endplate 166 moves along the outer surface of the sleeve 160 until the lower surface of the radial bump 180 engages the upper surface of the top endplate 166. Continued insertion causes the bump 180 to pass through the aperture in the end plate 166 until the bump snaps into place on the lower surface of the top endplate 166.

In the embodiment of FIG. 3, the filter media 164 is embedded into the endplate 166. In addition, a bottom endplate is not used. Instead, the filter media 164 is folded at the bottom of the filter media to close off the bottom end of the media. In addition, ribs 136 are provided at the base portion 128 of the housing 112 that extend upwardly from the base portion 128 to engage and support the base of the cartridge 116. The ribs 136 support the filter cartridge 116 and prevent the cartridge from dropping down toward the base of the housing and into the sump region in the event that the snap fit connection between the endplate 166 and the nutplate 114 becomes compromised, thereby maintaining the seal.

It is to be understood that other snap-fit connections can be used for retaining the endplate 166 to the nutplate 114. In addition, the ribs 136 could be formed as part of the filter cartridge 116 and extend downward into engagement with the base portion 128.

Figure 4:
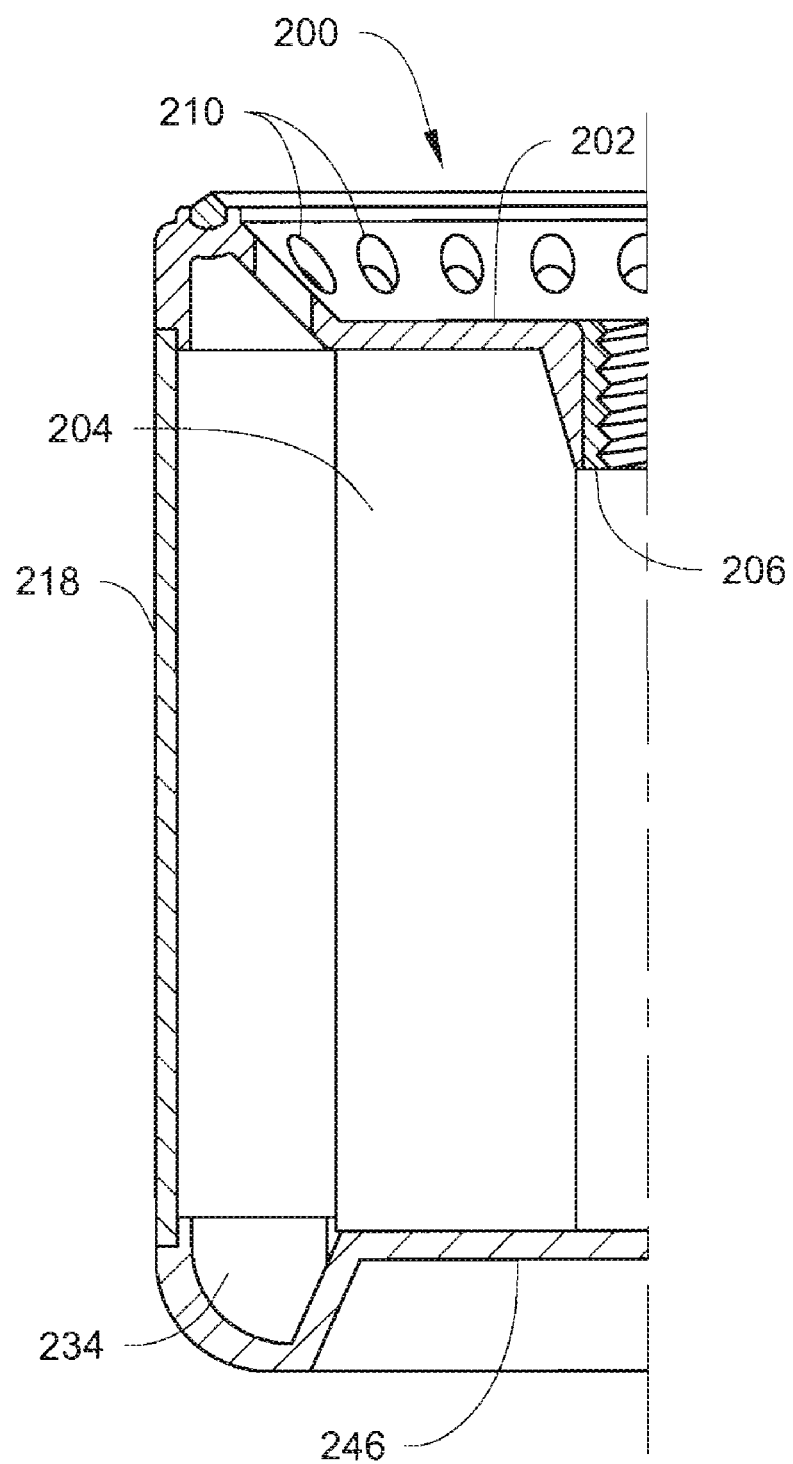
FIG. 4 is a partial cross sectional view of an alternative embodiment of connecting a filter cartridge and a nutplate.

FIG. 4 illustrates another embodiment that includes a nutplate 200 secured to a housing 218. The nutplate 200 includes a planar portion 202 and the filter media 204 of the filter cartridge is embedded or adhered to the planar portion 202 to secure the filter media 204 to the nutplate 200. The connection between the filter media and the planar portion 202 provides the seal that prevents fluid leakage. An internally threaded insert 206 is molded into a central aperture of the nutplate 200. A plurality of fluid inlet holes 210 are formed in the nutplate 200 to allow fuel to be filtered to enter the filter assembly, while filtered fuel exits through the insert 206.

In addition, the base portion of the molded housing 218 is shaped with a bulged portion 246 that projects upwardly into the interior of the housing 218 and is engaged with the bottom of the filter media. The bulged portion 246 supports the bottom end of the filter media 204 to keep the filter media engaged with the planar portion 202 of the nutplate if for some reason the connection between the top end of the filter media and the nutplate becomes compromised. An annular space 234 is formed around the bulged portion 246 which forms a collection sump area for collecting water separated from the fuel.

Figure 5:
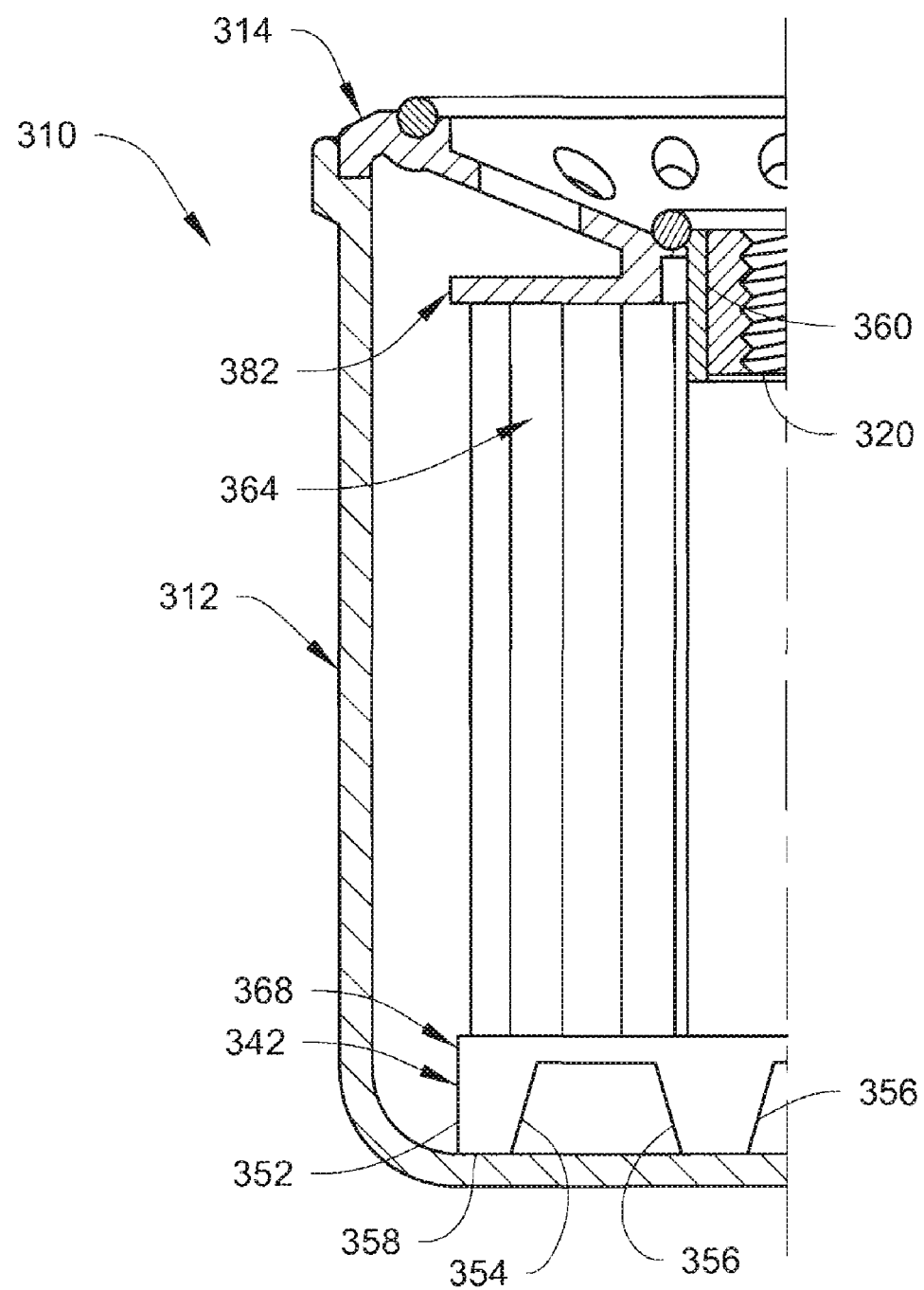
FIG. 5 is a partial cross sectional view of another embodiment of connecting a filter cartridge to a nutplate.

FIG. 5 illustrates an embodiment where a nutplate 314 includes a flange 382 to which the filter media 364 is embedded or adhered to seal between the filter cartridge and the nutplate. An internal thread 320 is formed on a sleeve 360 of the nutplate 314. A plurality of inlet holes 322 are formed in the nutplate 314 to allow fuel to be filtered to enter the filter assembly, while filtered fuel exits through the sleeve 360.

A bottom endplate 368 is attached to the bottom of the filter media 364. The endplate 368 includes a plurality of elevating members 342 that project downwardly from the endplate 368 and into engagement with the base portion of the filter housing 312. Each elevating member 342 is defined by an outer surface 352, an inner surface 354, two side surfaces 356 and a bottom surface 358 and is slightly tapered in a "V" shape. At least three, preferably four, elevating members 342 are provided.

The elevating members 342 create a collection sump area for collecting water separated from the fuel. In addition, the elevating member 342 support the bottom end of the filter cartridge to keep the filter cartridge engaged with the flange 382 of the nutplate 314 if the connection therebetween becomes compromised, thereby maintaining the seal between the filter cartridge and the nutplate.

FIGS. 6A, 6B, 6C and 6D illustrate alternative embodiments of nutplates 414, 414' that are generally similar to the nutplate 14 described above in FIG. 1A, but are designed to snap-fit connect with the filter cartridge to retain the filter cartridge connected to the nutplate.

Figure 6A:
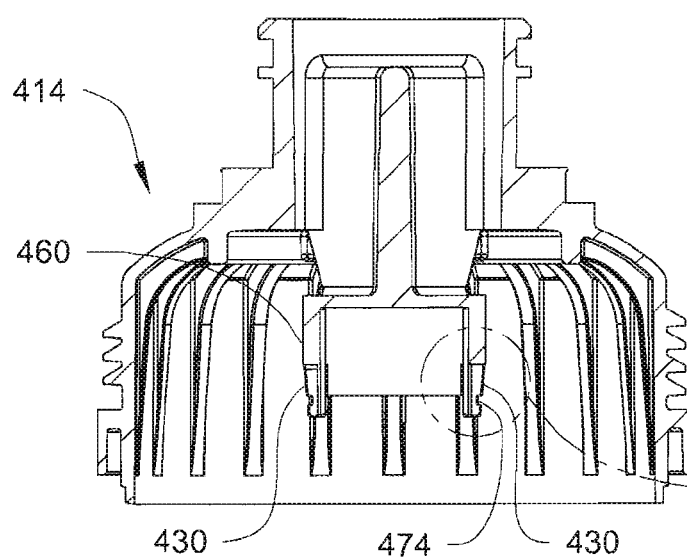
FIG. 6A is a cross sectional view of a nutplate with snap-in fingers.
Figure 6B:
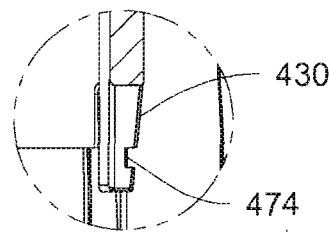
FIG. 6B is an enlarged view of the circled area in FIG. 6A.

With reference to FIGS. 6A-B, a plurality of circumferentially spaced, downwardly extending snap-fit fingers 430 are provided at the lower end of a sleeve 460 of the nutplate 414. Each of the fingers 430 tapers slightly toward its tip end, and includes an outwardly facing recess 474. The recesses 474 of the fingers 430 are designed to engage with a snap-fit connection member on the top endplate of the filter cartridge, for example the flange 70 as described above in FIG. 1.

Figure 6C:
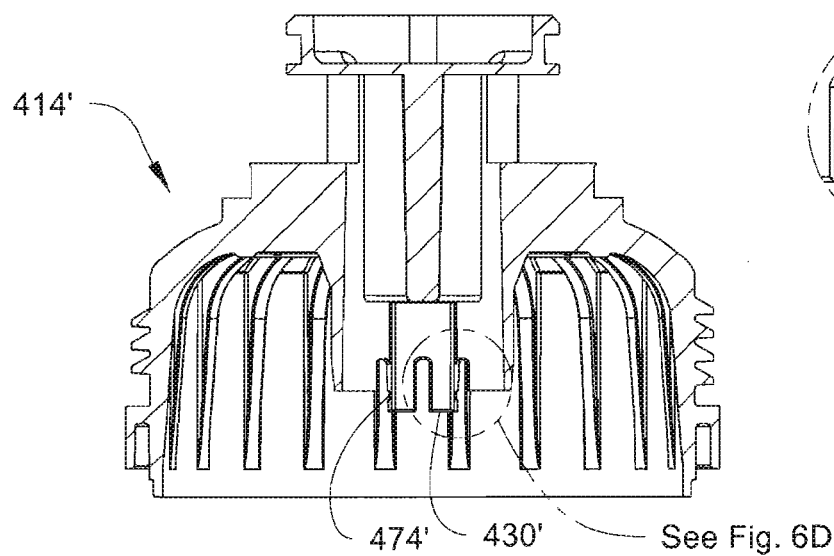
FIG. 6C is a cross sectional view of another embodiment of a nutplate with snap-in fingers.
Figure 6D:
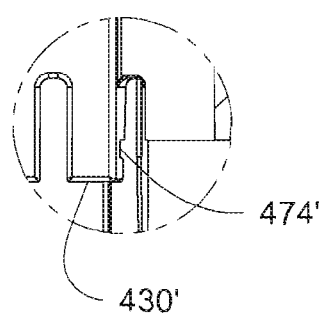
FIG. 6D is an enlarged view of the circled area in FIG. 6C.

In FIGS. 6C-D, the nutplate 414' includes a plurality of circumferentially spaced, downwardly extending snap-fit fingers 430' that project from a lower end of the protrusion (see element 42 in FIG. 1A). Each of the fingers 430' includes an outwardly facing recess 474'. The recesses 474' of the fingers 430' are designed to engage with a snap-fit connection member on the top endplate of the filter cartridge, for example a smaller diameter opening defined by the flange 70 described above in FIG. 1.

In the nutplates 414, 414', the plurality of fingers 430, 430' can be symmetrically or asymmetrically spaced, and different numbers of fingers can be used, for example, two, three, four, etc. For example, two fingers can be used that are spaced 180 degrees from each other, or three fingers spaced 120 degrees from each other, etc. The snap-fit fingers are made of materials that can provide sufficient resilience such that the fingers can flex backward when a predetermined force is applied to them, for example during assembly, and retract when the force is removed. In one embodiment, the snap-fit fingers are formed from non-metallic materials, such as plastic.

Figure 7:
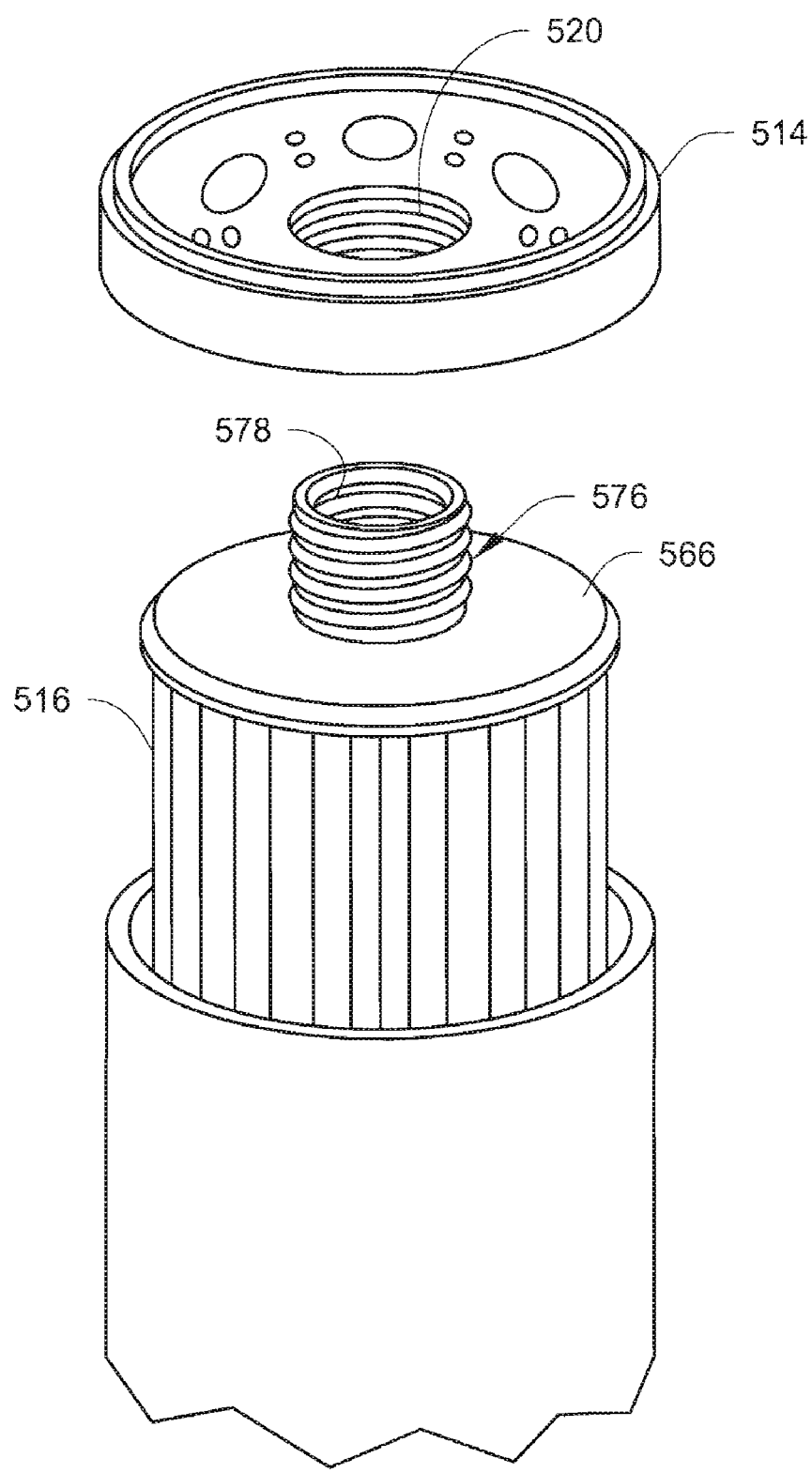
FIG. 7 is a perspective view of a threaded connection between a filter cartridge and a nutplate.

With reference to FIG. 7, a filter cartridge 516 is illustrated as including a top endplate 566 with a hollow, threaded protrusion 576 through which filtered fuel exits. A nutplate 514 includes a threaded opening 520 that threads onto the protrusion 576 to secure the filter cartridge to the nutplate 514. The inner surface of the protrusion 576 can also include threads 578 for use in connecting the filter assembly to the filtration system. In this embodiment, the threaded connection between the top endplate 566 and the nutplate 514 provides a seal to prevent fluid leakage between the unfiltered fuel region and the filtered fluid region.

Figure 8:
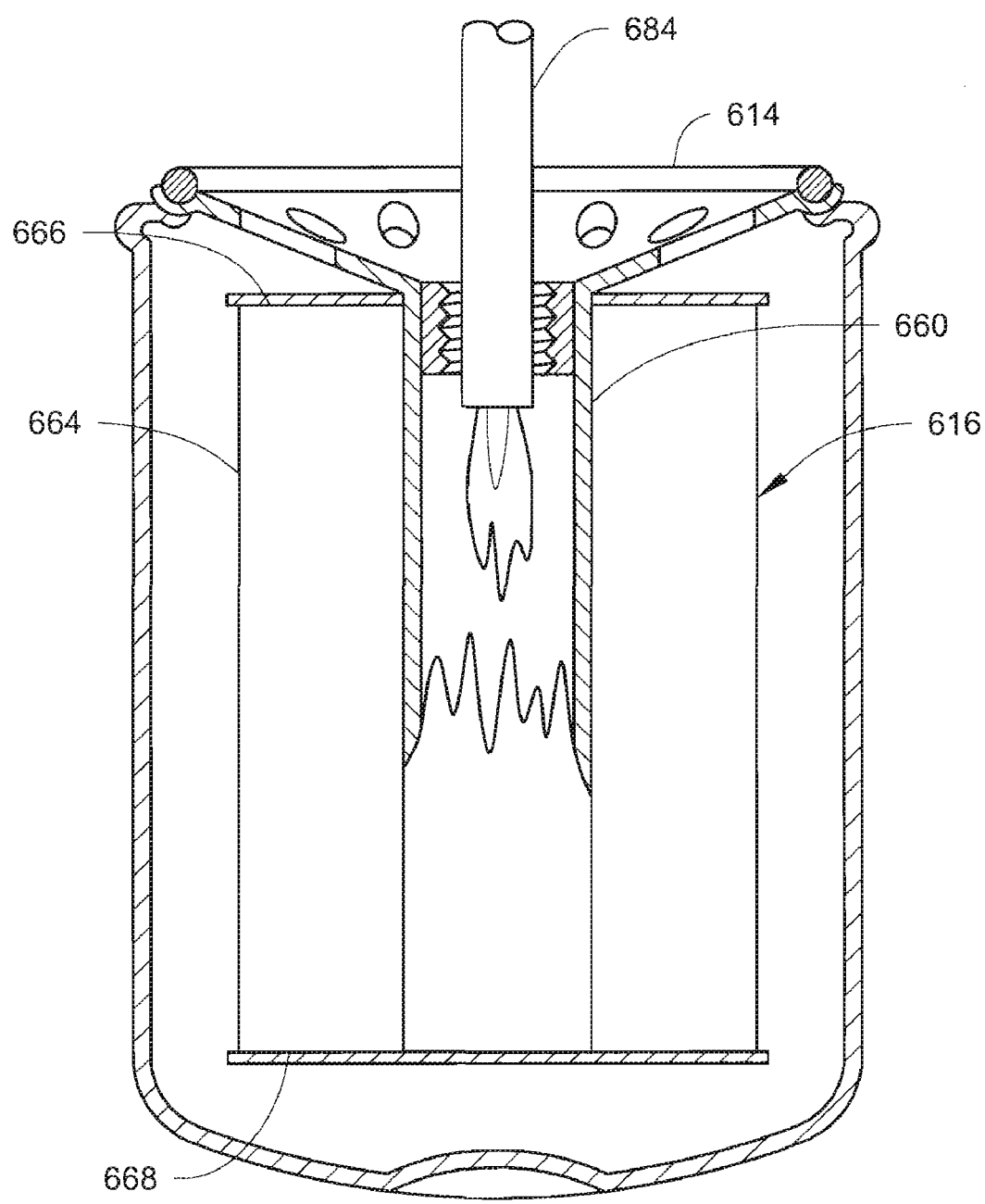
FIG. 8 is a cross sectional view of another method of connecting a filter cartridge to a nutplate.

FIG. 8 illustrates an embodiment where the filter media 664 of the filter cartridge 616 is joined to a nutplate 614 by melting a portion of the nutplate 614 to enable it to bond to the filter media or using adhesive. A hot melt adhesive can be used, for example a thermoplastic resin known in the art. To assemble the filter assembly, the top and bottom ends 666, 668 of the filter media 664 are sealed, for example by connecting them to endplates. Then the filter media 664 is pressed onto a sleeve 660 extending downward from the nutplate 614. A probe 684 is then inserted through the center of the nutplate 614 adjacent the end of the sleeve 660 to join the filter media 664 and the nutplate 614. The probe 684 may be a flame melt welder that melts a portion of the sleeve 660 to bond the sleeve 660 to the media, or a heat probe that heats adhesive for bonding the sleeve 660 to the media.

It is to be realized that each of the features described in FIGS. 1-8 can be used individually or collectively with other features described in FIGS. 1-8. For example, rather than the interference connection between the sleeves 60, 70 in FIG. 1A, any of the other connection methods described in FIGS. 3-8 can be used in combination with the stepped ribs 36 of FIG. 1A. Further, the described methods of connecting the top end of the filter cartridge to the nutplate can be used by themselves, without use of the ribs 36, 136, the bulged portion 246, or the elevating members 342. In addition, the ribs 36, 136, the bulged portion 246, or the elevating members 342 can be used with any of the described methods of connecting the top end of the filter cartridge to the nutplate.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A filter assembly comprising:
a housing having a side wall, a base portion, an open end, an interior space, and a plurality of ribs formed on an inner surface of the housing within the interior space;
a nutplate configured to engage the side wall for closing the open end of the housing, the nutplate including a first fluid passage through which filtered fluid from the interior space exits the filter assembly, and a second fluid passage through which fluid to be filtered enters the interior space;
a filter cartridge disposed within the interior space, the filter cartridge including a first end facing the base portion of the housing and a second end facing the open end and the nutplate, the second end is connected to the nutplate and there is a seal between the second end and the nutplate that prevents leakage of fluid between the second end and the nutplate;
at least some of the ribs include steps positioned adjacent to the first end of the filter cartridge that are spaced from the first end of the filter cartridge so that there is a gap between the steps and the first end of the filter cartridge, the steps are sized for engagement with the first end to limit movement of the filter cartridge away from the nutplate.

2. The filter assembly of claim 1, wherein there is no spring within the housing that is engaged with the first end of the filter cartridge.

3. The filter assembly of claim 1, wherein there is no elastomeric seal between the filter cartridge and the nutplate.

4. The filter assembly of claim 1, wherein the second end of the filter cartridge is connected to the nutplate by a snap-fit connection, a threaded connection, an interference fit, or an integral bond.

5. The filter assembly of claim 1, wherein the filter cartridge includes an endplate at the second end thereof that is connected to the nutplate, and the filter cartridge includes an endplate at the first end thereof that is engageable with the steps.

6. The filter assembly of claim 5, wherein the endplate at the second end of the filter cartridge is connected to the nutplate by a snap-fit connection that includes a plurality of snap-fit fingers integral with the nutplate.

7. The filter assembly of claim 5, wherein the ribs are on the inner surface of the side wall and extend from adjacent the open end to the base portion, the steps project radially inwardly from the ribs at a location between the base portion and the open end.

8. The filter assembly of claim 1, wherein the filter cartridge includes a filter element that is directly bonded to the nutplate.

9. The filter assembly of claim 1, wherein the housing and the nutplate are formed from non-metallic material.

10. A filter assembly comprising:
a housing having a side wall, a base portion, an open end, an interior space, and a plurality of ribs formed on an inner surface of the housing within the interior space;
a nutplate configured to engage the side wall for closing the open end of the housing, the nutplate including a first fluid passage through which filtered fluid from the interior space exits the filter assembly, and a second fluid passage through which fluid to be filtered enters the interior space;

a filter cartridge disposed within the interior space, the filter cartridge including a first end facing the base portion of the housing and a second end facing the open end and the nutplate, the second end is connected to the nutplate and there is a seal between the second end and the nutplate that prevents leakage of fluid between the second end and the nutplate;

at least some of the ribs include steps positioned adjacent to the first end of the filter cartridge that are sized for engagement with the first end to limit movement of the filter cartridge away from the nutplate, and wherein some of the plurality of ribs are devoid of the steps.

11. A filter assembly comprising:

a can having a side wall, a bottom wall connected to the side wall and defining a base portion of the can, an open end opposite the base portion, an interior space, and a plurality of ribs formed on an inner surface of the can within the interior space;

a plate configured to engage the side wall for closing the open end of the can, the plate including a fluid outlet through which filtered fluid from the interior space exits the filter assembly, and a fluid inlet through which fluid to be filtered enters the interior space;

a filter cartridge disposed within the interior space, the filter cartridge including a ring of filter material that defines within the interior space of the can an unfiltered fluid side in communication with the fluid inlet and a filtered fluid side in communication with the fluid outlet; the ring of filter material including a first end adjacent the base portion of the housing and a second end adjacent the open end and the plate;

the second end is connected to the plate and there is a seal between the filter cartridge and the plate that prevents leakage of fluid between the filter cartridge and the plate from the unfiltered fluid side to the filtered fluid side; and at least some of the ribs include steps positioned adjacent to the first end of the ring of filter material that are spaced from the first end of the filter cartridge so that there is a gap between the steps and the first end of the filter cartridge, the steps are sized for engagement with the filter cartridge to limit movement of the filter cartridge away from the plate.

12. The filter assembly of claim 11, wherein there is no spring within the can that is engaged with the filter cartridge.

13. The filter assembly of claim 11, wherein there is no elastomeric seal between the filter cartridge and the plate.

14. The filter assembly of claim 11, wherein the filter cartridge is connected to the plate by a snap-fit connection, a threaded connection, an interference fit, or an integral bond.

15. The filter assembly of claim 11, wherein the filter cartridge includes an endplate at the second end of the ring of filter material that is connected to the plate, and the filter cartridge includes an endplate at the first end of the ring of filter material that is engageable with the steps.

16. The filter assembly of claim 15, wherein the endplate at the second end of the filter cartridge is connected to the plate by a snap-fit connection that includes a plurality of snap-fit fingers integral with the plate.

17. The filter assembly of claim 15, wherein the ribs are on the inner surface of the side wall and extend from adjacent the open end to the base portion, the steps project radially inwardly from the ribs at a location between the base portion and the open end.

18. The filter assembly of claim 11, wherein the ring of filter material is directly bonded to the plate.

19. The filter assembly of claim 11, wherein the housing and the plate are formed from non-metallic material.

20. A filter assembly comprising:

a can having a side wall, a bottom wall connected to the side wall and defining a base portion of the can, an open end opposite the base portion, an interior space, and a plurality of ribs formed on an inner surface of the can within the interior space;

a plate configured to engage the side wall for closing the open end of the can, the plate including a fluid outlet through which filtered fluid from the interior space exits the filter assembly, and a fluid inlet through which fluid to be filtered enters the interior space;

a filter cartridge disposed within the interior space, the filter cartridge including a ring of filter material that defines within the interior space of the can an unfiltered fluid side in communication with the fluid inlet and a filtered fluid side in communication with the fluid outlet; the ring of filter material including a first end adjacent the base portion of the housing and a second end adjacent the open end and the plate;

the second end is connected to the plate and there is a seal between the filter cartridge and the plate that prevents leakage of fluid between the filter cartridge and the plate from the unfiltered fluid side to the filtered fluid side; and at least some of the ribs include steps positioned adjacent to the first end of the ring of filter material that are sized for engagement with the filter cartridge to limit movement of the filter cartridge away from the plate, and wherein some of the plurality of ribs are devoid of the steps.

* * * * *